UNITED STATES PATENT OFFICE.

A. C. VAUTIER, OF PARIS, FRANCE.

IMPROVED MODE OF EXTRACTING FILAMENTOUS MATTER SIMILAR TO SILK, COTTON, AND THE LIKE FROM THE BARK AND LEAVES OF VARIOUS TREES.

Specification forming part of Letters Patent No. 33,551, dated October 22, 1861.

*To all whom it may concern:*

Be it known that I, A. C. VAUTIER, of Paris, in the Empire of France, have invented a new and useful method of extracting a new fibrous matter, of a silky or cotton nature, which can be applied to all textile fabrics, or new method to produce silk, by extracting silky fibers contained in the bark and leaves of every kind of mulberry tree, by a process or processes equally calculated to be applied to the extracting of silky fibers from the barks and leaves of the elm, the peach tree, and from other trees and shrubs; and I hereby declare the following to be a full, clear, and exact description of the same.

Silk has been heretofore obtained from the caterpillar or *bombyx* of the mulberry tree. Men who specially devoted themselves to the study of silk confined their observations to this product, not even supposing that silk could be produced without using silk-worms. By this my invention I am enabled to extract silk directly from the bark and leaves of every kind of mulberry tree, and even from those upon which the *bombyx* is not fed. I operate directly on the woody part of the tree covered with its bark and leaves; or I may previously take off the bark and leaves, in order to treat them separately. The bark is easily separated from or stripped off the tree at the time of full sap. If the tree be cut later in the season, or allowed to dry too much after being cut, of course the bark will strongly adhere to the wood. In such case it will be necessary to submit the wood to maceration in water; or, if preferred, the wood may be constantly watered, so as to keep it perfectly wet. The fermentation which will arise may be accelerated by resorting to artificial means of provoking it, such as boiling water or steam.

I operate on green or fresh barks and leaves in the same way as on dry ones; but I prefer to treat the former, or such barks and leaves of which a complete desiccation was artificially prevented, because it is far easier to free them from fleshy matters, gummy substances, &c., necessary to effect disintegration. The matter separated from the wood is then treated by maceration in boiling water or steam, after being more or less triturated, in order to facilitate the division of fibers and their separation from fleshy parts, as well as the dissolution of various gummy substances. I triturate the matter when in a wet state, either by hand or mechanically, by using bats, pestles, fluted cylinders, or any kind of mashing implements calculated to effect the disaggregation of the above matters. If after a first operation the disaggregation does not appear to be complete or sufficient, the matter should again be treated by boiling water, by steam, &c., with repeated triturations. By maceration or fermentation fleshy and gummy parts are decomposed. By using boiling water or steam a regular coction of fleshy parts is effected, and thus fibrous matter is more readily separated from fleshy or gummy substances. During the maceration with boiling water or steam, as well as in such various operations and wet triturations as hereinafter described, acetic acid or other acid or alkaline substances—such as soda, potash, soap, chloride of sodium—may or may not be used, according to the quality of the water and the nature of the plants operated upon. During those different triturations the matter will be watered either with cold or hot water, or submitted to the action of steam. Immediately after these various operations, and without any previous desiccation, which would only cause coagulation and render the fibrous matter again adhesive, the matter, together with the extraneous bodies which by the former operations could not be separated satisfactorily, is washed over and over again in water, which may be applied in small currents or shower, either hot or cold, or saturated or not with acids or alkaline substances. The matter thus obtained, after being exposed in open air, or preferably under shelter or under cover, which, without preventing the circulation of air, is better calculated to slacken the drying process and leave more flexibility to the matter, then appears in the form of bright white and flexible fibers having the brilliancy and aspect of wadding or flocks, resembling fine silk fibers, both as regards shape and strength. Thus the matter may be combed or carded and spun, either wet or dry, by using, according to the products to be obtained, processes specially employed in the manufacture of silk, flax, and cotton fabrics.

From the bark and leaves of elm, which is of the family of *Urticeæ*, like the mulberry tree, from the peach tree, and from other trees and shrubs from the *Amygdaleæ*, I extract a silk which is less bright, but as copious, compact, and fine. To extract this silk I resort to the process described for extracting silk from the mulberry tree. From the bark of the mulberry tree, elm, and peach tree, &c., when the trees are not too old, the fibrous matter may be extracted by a process of combing or carding. It will be found, however, that a great waste or loss accrues thereby, on account of insufficient or imperfect disaggregation of foreign substances combined with and adhering to the fiber.

The different operations are carried on successively in a wet state, or without any previous desiccation. They may, however, be interrupted and the matter dried at every stage of the proceedings, either to be sent off and worked off in such state, or to be treated afterward after previously wetting and mollifying.

This my discovery has led me to experiment on a large number and variety of barks and leaves of trees, and I have ascertained that a great many contain fibers which, on account of their silky, cottony, or other filamentous nature, may be profitably used in the manufactures, particularly in spinning and weaving and felting, and also in manufacturing paper and pasteboard. Among the trees and shrubs which yielded rich products, I shall mention, first, in the family of *Rosaceæ* and the variety of *Amygdaleæ*, the almond tree, the plum tree, and the apricot tree; in the variety of *Pomaceæ*, the quince tree and the medlar tree; second, in the family of *Papilionaceæ* and the variety of *Mineoseæ*, the acacia, the false acacia, and the different *Mimosæ*.

Having thus described my invention and the manner in which the same is or may be carried into effect and reduced to practice, I shall state my claim as follows:

The method or process herein described of extracting the filamentous matter of a silky, cottony, and other similar nature contained in the bark and leaves of the mulberry, elm, peach, and other trees and shrubs, so as to render the product thus obtained convertible into yarns and tissues, substantially as set forth.

A. C. VAUTIER.

Witnesses:
GEO. HUTTON,
EMILE BARRAULT.